United States Patent Office 3,466,332
Patented Sept. 9, 1969

3,466,332
BETA-DISUBSTITUTED ALPHA-INDANONES AND THE PROCESS FOR PREPARING THEM FROM ARYL-SUBSTITUTED ALIPHATIC HALIDES
Herman A. Bruson, Woodbridge, and Howard L. Plant, Milford, Conn., assignors to Olin Mathieson Chemical Corporation, a corporation of Virginia
No Drawing. Filed Feb. 11, 1965, Ser. No. 432,013
Int. Cl. C07c 49/76
U.S. Cl. 260—590   8 Claims

ABSTRACT OF THE DISCLOSURE

The process for preparing beta-disubstituted alpha-indanones by reacting carbon monoxide and an aryl-substituted aliphatic halide in the presence of an aluminum halide selected from the group consisting of aluminum chloride and aluminum bromide.

---

This invention relates to an improved process for preparing beta-disubstituted alpha-indanones and certain novel compositions produced thereby.

In the past, such compounds have been prepared by reacting various arylpropionic acids or the corresponding acid chlorides with acidic condensing agents such as hydrogen fluoride, aluminum chloride or phosphoric anhydride to effect a ring closure, as follows:

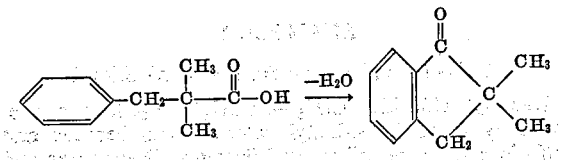

Usually the products have been costly because of the numerous steps involved in preparing the required α,α-disubstituted arylpropionic acids (or the corresponding acid chlorides).

For example, 2-methyl-2-phenylindanone-1, a valuable intermediate for new drugs, was obtained by a costly method in a series of five steps, by Neil Campbell and Englebart Ciganek, Jour .Chem. Soc. (London) 1956, 3834–3836, as shown below:

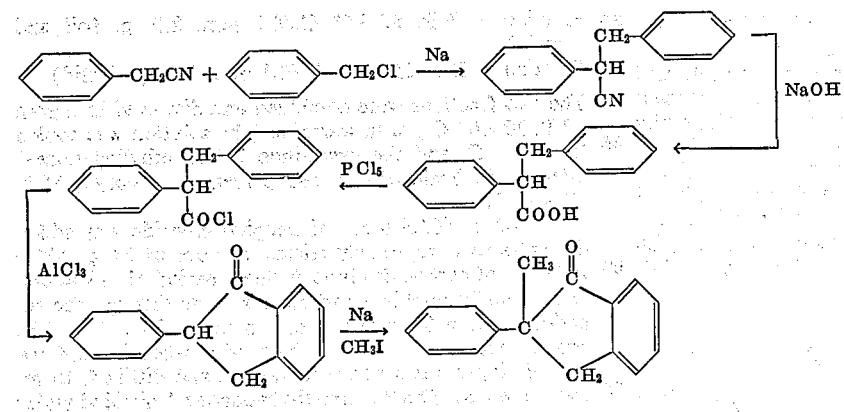

There is a substantial need for a more direct, more economical procedure for preparing beta-disubstituted alpha-indanones.

It is a primary object of this invention to overcome the disadvantages inherent in previously known techniques for preparing beta-disubstituted alpha-indanones.

Another object of the invention is to provide an improved process for preparing beta-disubstituted alpha-indanones.

Still another object of the invention is to provide an improved process for preparing 2 - methyl-2-phenylindanone-1.

It is a further object to provide novel beta-disubstituted alpha-indanones.

These and other objects of the invention will be apparent from the following detailed description thereof.

It has now been discovered that the foregoing objects are accomplished when certain aryl-substituted aliphatic halides, described more fully hereinafter, are reacted with carbon monoxide in the presence of an aluminum halide selected from the group consisting of aluminum chloride and aluminum bromide, and preferably in the presence of an aromatic compound.

More in detail, aryl-substituted aliphatic halides suitable for use in preparing beta-di-substituted alpha-indanones in accordance with the novel process of this invention include aryl-substituted halogenated alkanes selected from the group consisting of:

1-halogeno-2-methyl-2-phenylpropane,
1-phenyl-2-halogeno-2-methylpropane,
1-halogeno-2-phenylpropane,
1-phenyl-2,2-dihalogenopropane, and
1-phenyl-2-halogenopropane.

aryl-substituted halogenated alkanes selected from the group consisting of 1-phenyl-2-halogenopropene-1-, and
1-phenyl-2-halogenopropene-2, halgenated aryl-substituted halogenated alkanes selected from the group consisting of 1-halogeno-2-(beta-halogeno-tertiary butyl)benzene,
1-halogeno-4-(beta-halogeno-tertiary butyl)benzene,
1,4-dimethyl-bis-2,5-(beta-halogeno-tertiary butyl) benzene,
1,4-dimethyl-2-(beta-halogeno-tertiary butyl)benzene, and mixtures thereof.

In describing the aryl-substituted aliphatic halides throughout the description and claims, the halogen substituents referred to include bromine, chlorine, fluorine, iodine and mixtures thereof.

The reaction of the aryl-substituted aliphatic halide with carbon monoxide is carried out in the presence of an aluminum halide selected from the group consiting of aluminum chloride, aluminum bromide and mixtures thereof. The commercially available "anhydrous" material, or these compounds containing small quantities (up to about three percent by weight) of water may be employed. The proportion of aluminum halide is generally in the range between about 1 and about 2 moles per mole of the aryl-substituted aliphatic halide, but greater or lesser proportions may be employed if desired. The preferred proportion is in the range between about 1.25 and about 1.6 moles of aluminum halide per mole of the aryl-substituted alphatic halide.

The proportion of carbon monoxide employed in carrying out the process of this invention is generally equivalent to between about one and about five, and preferably between about one and about three moles per mole of aryl-substituted alphatic halide employed as a reactant.

The reaction is preferably carried out in the presence of an aromatic compound having two reactive positions in the aromatic ring which are ortho to each other and available for Friedel-Crafts alkylation and acylation. Suitable aromatic compounds include benzene, halogenated benzenes such as monochlorobenzene, monobromobenzene and monofluorobenzene, alkyl-substituted benzenees such as toluene, o-, m-, or para-xylene, cumene, pseudo-cumene, tertiary butylbenzene, ethylbenzene, diethylbenzene, cycloalkyl-substituted benzenes such as cyclohexylbenzene and mixtures thereof. Other aromatic compounds such as anisole, phenetol, diphenyl ether, diphenylmethane, diphenyl ethane, diphenyl, naphthalene, anthracene, indanone, phenanthrene are also capable of producing indanones but separation is difficult because of the other reaction products including resins, aldehydes and tar-like materials. The proportion of aromatic compound is generally equivalent to at least one mole of the aromatic compound per atom of halogen in the aryl-substituted adiphatic halide, but is preferably between about four and about eight times the stoichiometric proportion.

The process of this invention is generally carried out at a temperature in the range of about 0° C. and about 80° C., and preferably between about 15° C. and about 30° C. Atmospheric pressure is generally suitable for effecting the reaction, but super-atmospheric pressures or sub-atmospheric pressures may be employed if desired.

Inert organic solvents such as carbon disulfide or petroleum ether may be employed if desired, and are particularly useful when the reaction mixture is highly viscous.

In one embodiment of the invention the aluminum halide is suspended in the aromatic compound, with or without the inert solvent, as the case may be, and a rapid stream of carbon monoxide is passed through the stirred suspension, while simultaneously gradually adding the aryl-substituted aliphatic halide to the suspension. The rate of addition of carbon monoxide is generally equivalent to approximately the rate of liberation of hydrogen halide.

If desired, however, the aryl-substituted aliphatic halide may be first admixed with the aluminum halide, with or without the aromatic compound or inert solvent, and the resulting aluminum halide complex is then reacted with carbon monoxide to effect a ring closure. Generally the yield of alpha-indanones is lower when employing the latter embodiment than that obtained by the simultaneous addition of carbon monoxide and aryl-substituted aliphatic halide to the suspension of aluminum halide.

In order to illustrate the types of reactants that may be employed and the type of reactions that occur, the following equations are presented.

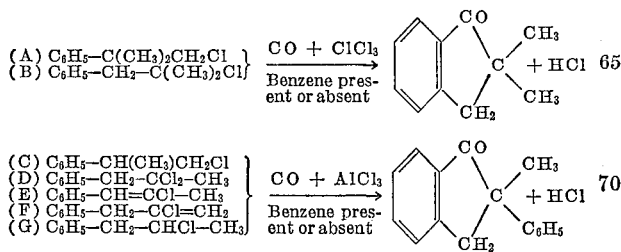

Furthermore, it is possible by the present invention to prepare alpha-indanones having two different aromatic groups as represented by the following reaction (Equation H).

(H)

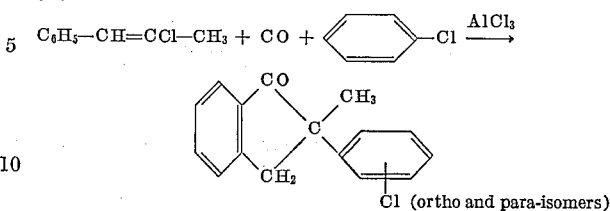

Compounds prepared by the process of this invention are useful as intermediates in the preparation of pharmaceuticals such as anti-anxiety and pain relieving drugs. In addition, liquid compounds of this type prepared from alkyl benzenes have very pleasant odor properties which make them suitable in the preparation of perfumes.

In Equations A–H, the chloride substituent of the aryl-substituted aliphatic halide can be replaced with any other halide to obtain similar results. Also, all or part of the $AlCl_3$ can be replaced with $AlBr_3$ in Equations A–H to obtain the same or similar results.

In all of the reactions of this invention, the halide substituents of the aryl-substituted aliphatic halide are preferably chlorine or bromine, for practical and economic reasons.

The following examples are presented to define the invention more fully without any intention of being limited thereby. All parts and percentages are by weight unless otherwise specified.

EXAMPLE 1

2,2-dimethylindanone-1 from neophyl chloride

Neophyl chloride, $C_6H_5$—$C(CH_3)_2CH_2Cl$, was prepared by reacting methallyl chloride with benzene and sulfuric acid as described by Whitmore, Weisgerber and Shabica, Jour. Amer. Chem. Soc. 65, 1469 (1943).

(a) 67.5 g. (0.4 mol) of neophyl chloride was added dropwise over a period of three hours to a vigorously stirred mixture of 54 g. (0.4 mol) $AlCl_3$ in 188 g. (2.4 mol) benzene maintained at 21–22° C. Carbon monoxide was rapidly bubbled through the mixture during the entire 4½ hour reaction period. The solution was poured onto 400 g. crushed ice, stirred, the benzene layer separated, washed, dried, and distilled eventually under reduced pressure.

Fraction 1. B.P. 62–85° C./0.1 mm. 8.0. g. (oil and solid)

Fraction 2. B.P. 85–101° C./0.1 mm. 51.0 g. (solid)

The two fractions were combined and dissolved in ligroin (B.P. 30–60° C.) with warming. The solution was cooled to —40° C. and the crystalline 2,2-dimethylindanone-1 filtered off. Yield=52 g. (81 percent of theory), M.P. 42–43° C.

(b) 42 g. (0.25 mol) of neophyl chloride was added dropwise to a vigorously stirred mixture of 34 g. $AlCl_3$ in 200 g. of carbon disulfide during a period of 2⅓ hours, while rapidly bubbling carbon monoxide through the reaction mixture for a period of 5 hours at 20–25° C. The product was poured onto 500 cc. of crushed ice and the organic layer was separated, washed, and distilled, to remove the $CS_2$. The 2,2-dimethylindanone-1 distilled under reduced pressure at 110–158° C./0.1 mm. and crystallized on cooling. Yield=17.4 g. Upon recrystallization from cold ligroin it formed white crystals, M.P. 42° C.

EXAMPLE 2

2,2-dimethylindanone-1 from 1-phenyl-2-chloro-2-methylpropane 42 g. (0.25 mol) of 1-phenyl-2-chloro-2-methylpropane, $C_6H_5$—$CH_2$—$C(CH_3)_2Cl$, was added dropwise to a vigorously stirred mixture of 35 g. (0.25 mol) AlCl₃ in 156 g. (2.0 mol) benzene while a continuous stream (120 cc./min.) of CO was being bubbled through the solution. The temperature was controlled at 23–25° C. during the four hour reaction period. After working up by hydrolysis, washing, drying and distillation under reduced pressure as described in Example 1, 24.3 g. (60 percent of theory) of pure, recrystallized 2,2-dimethylindanone, M.P. 44° C., was obtained.

The 1-phenyl-2-chloro-2-methylpropane used above was prepared by refluxing neophyl chloride for 17 hours under an 8-plate column and recovering by distillation, a mixture of 1-phenyl-2-methylpropene-1, 1-phenyl-2-methylpropene-2, and 1-phenyl-2-chloro-2-methylpropane as described by Whitmore, et al., Jour. Amer. Chem. Soc. 65, 1470 (1963). This mixture was then treated in toto with hydrogen chloride at 0° C. which converted the 1-phenyl-2-methylpropene-1 and the 1-phenyl-2-methylpropene-2 into 1-phenyl-2-chloro-2-methylpropane, as illustrated by the following equations:

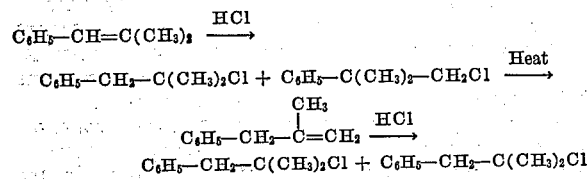

In this manner 65 percent of the original neophyl chloride was converted to 1-phenyl-2-chloro-2-methylpropane boiling at 88° C./10 mm.

EXAMPLE 3

2-methyl-2-phenylindanone-1 from 1-phenyl-2-chloropropene-1 and -2

230 g. (1.1 mol) of PCl₅ was added slowly to 150 g. (1.12 mol) of phenylacetone which was stirred and maintained at 15–20° C., throughout the reaction. The solution was distilled directly employing a 14 inch helices-packed column until a vapor temperature of 110° C. was attained; thus removing POCL₃. The residue was distilled under reduced pressure, and the fraction boiling at 68–84° C./0.1 mm. (83 g.) was collected. It contained 26.1 percent Cl (theory for 1-phenyl-2-chloropropene is 23.3 percent Cl) and consisted of a mixture of 1-phenyl-2-chloropropene-1 and -2, in addition to some

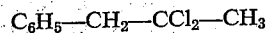
C₆H₅—CH₂—CCl₂—CH₃ as shown by nuclear magnetic resonance analysis. For conversion to 2-methyl-2-phenylindanone-1, as shown below, all three components are equivalent and yield the same product.

61 g. (0.4 mol) of the above mixture was added dropwise over a period of 2½ hours to a vigorously stirred slurry of 55 g. (0.4 mol) AlCl₃ in 188 g. (2.4 mol) benzene maintained at 23–26° C. Carbon monoxide was rapidly bubbled into the mixture throughout the 3¼ hour reaction period. The solution was poured onto 500 cc. of crushed ice, stirred, the benzene layer separated, washed, dried and distilled, eventually under reduced pressure to give 53.8 g. of crystalline solid boiling at 130–200° C./ 0.3 mm. which upon trituration with ligroin to remove oily impurity, yielded 35.5 g. of pure 2-methyl-2-phenyl-indanone (M.P. 110.5–111° C.) upon recrystallization from 100 cc. of methanol. Yield, 42.3 percent of theory.

EXAMPLE 4

2-methyl-2-(chlorophenyl)indanone-1

A mixture of C₆H₅—CH₂—CCl₂—CH₃ (5 percent), CH₆H₅—CH₂—CCl=CH₂ (15 percent) and

C₆H₅—CH=CCl—CH₃

(80 percent) obtained from the treatment of phenylacetone with PCl₅ as described in Example 3, was used as described below.

63.7 g. (0.42 mol) of the above mixture was added dropwise over a period of 2¼ hours to a vigorously stirred mixture of 56.5 g. (0.42 mol) AlCl₃ and 225 g. (2.0 mol) chlorobenzene maintained at 26–28° C., while carbon monoxide was rapidly bubbled into the mixture throughout the entire 3½ hour reaction period. The mixture was decomposed with ice and the oil layer washed, dried and distilled under reduced pressure. The following fractions were collected after removal of the chlorobenzene.

|  | G. |
|---|---|
| (I) Up to 160° C./0.05 mm. | 5.1 |
| (II) 160–180° C./0.05 mm. | 13.1 |
| (III) 180–197° C./0.05 mm. | 25.0 |
| (IV) 197–200° C./0.05 mm. | 6.3 |
| (V) Residue | 26.4 |

Fractions I and II solidified. Upon crystallization from ligroin 4.9 g. of crystalline product (M.P. 98–105° C.) was obtained, which upon recrystallization from methanol gave 3.7 g. of pure 2-methyl-2-phenylindanone-1, M.P. 110° C.

Fraction III upon fractional distillation gave a cut (7 g.) boiling at 170–171° C./0.2 mm., having $$n_D^{20}=1.6130$$

containing 13.7 percent Cl by analysis corresponding to the formula C₁₆H₁₃OCl. It was a pale yellow thick liquid having the structure

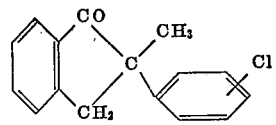

and is a mixture of the ortho- and para-chloro compound.

EXAMPLE 5

2-methyl-2-phenylindanone-1 from 1-phenyl-2-chloropropane 17.6 g. (0.114 mol) of 1-phenyl-2-chloropropane was added dropwise over a period of one hour to a stirred mixture of 20 g. AlCl₃ (0.15 mol) in 78 g. (1.0 mol) benzene maintained at 23° C. while carbon monoxide was bubbled in rapidly and in excess during a two hour reaction period. Upon working up by hydrolysis, washing and distillation, 7.5 g. of crude semi-solid 2-methyl-2-phenylindanone-1 boiling at 108–142° C./0.1 mm. was obtained, which upon recrystallization gave 3.6 g. of the pure product, M.P. 110–111° C.

The 1-phenyl-2-chloropropane used above was prepared by reacting benzene with allyl chloride in the presence of FeCl₃ as described by T. M. Patrick, E. T. McBee and H. B. Haas, Jour. Amer. Chem. Soc. 68, 1009–1011 (1946).

EXAMPLE 6

Dismutation of 1,4-dimethyl-bis-2,5(beta-chloro tert. butyl) benzene in benzene to yield 2,2-dimethylindanone-1

Sixty-six (66) gms. (0.23 mol) of 1,4-dimethyl-bis-2,5(beta-chloro tert.butyl) benzene in 300 ml. of warm benzene (30–40° C.) was added dropwise over a period of 2½ hours to a vigorously agitated slurry of 70 gms. (0.5 mol) AlCl₃ in 200 ml. of benzene through which a continuous stream (120–140 ml./min.) of carbon monoxide was passed. The temperature was maintained at 10–20° C. throughout the entire 3½ hour reaction period. The red oil was decomposed on 400 gms. of crushed ice, organic layer separated, washed with 200 ml. of water, and dried over anhydrous Na₂SO₄. The benzene was removed and 63 gms. of oil boiling 70–130° C./0.1 mm. was isolated. The oil was taken up in 100 ml. of low boiling ligroin and cooled in a Dry Ice chest overnight. 35.7 gms. of pure 2,2-dimethyl indanone-1 was separated by filtration.

EXAMPLE 7

A. Preparation of 1-chloro-2-(beta-chloro-tertiary butyl) benzene and 1 - chloro - 4-(beta-chloro-tertiary butyl) benzene One hundred and one (101) gms. (1.11 mol) of methallyl chloride was added dropwise to a vigorous agitated mixture of 360 gms. (3.2 mol) of chlorobenzene and 100 gms. of conc. sulfuric acid over a period of 5½ hours and at a temperature of 20° C. Stirred for an additional 16 hours. The acid layer was removed and the organic layer after washing with 3× 100 ml. of water was dried over anhyd. $Na_2SO_4$. Careful fractionation yielded 45 gms., boiling 129.5–131° C./10.4 mm., $n_D^{24}$ 1.5385 which instrumental analysis indicated as a mixture of the 2- and 4-chlorophenyl isomers.

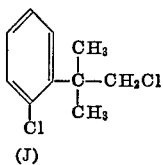 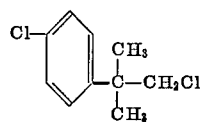

(J)  (K)

Elemental analyses of the product were as follows: Calculated, C, 59.1%; H, 4.91%; Ch, 35.0%. Found: C, 59.32%, 59.27%; H, 5.90%, 5.86%; Ch, 35.1%; 35.1%.

B. Preparation of 2,2-dimethyl-4-chloro-indanone-1 and 2,2-dimethyl-6-chloro-indanone-1

41 grams of the mixture of isomers (J and K) prepared in Examples 7A were added dropwise to a vigorously stirred mixture of 27 gms. (0.2 mol) $AlCl_3$ in 150 gms. of chloro benzene over a period of three hours, while a continuous stream of carbon monoxide was bubbled into the mixture at 20–21° C. The reaction mixture was decomposed on 300 gms. of crushed ice, the oil layer washed, dried over $Na_2SO_4$, and the high boiling products distilled under reduced pressure. The crude liquid distillate boiling at 93–130° C./0.1 mm (26.2 gms.) was fractionally redistilled to give a product boiling at 112–114° C./2.6 mm. (11.5 gms.) as a pale yellow liquid $n_D^{22}$ 1.5532 shown to be by elemental and instrumental analysis a mixture of two isomers represented by Formulae L and M:

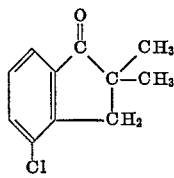 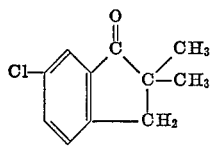

(L)  (M)

Elemental analyses of the product were as follows: Calculated, C, 67.8%; H, 5.66%; CH, 18.25. Found: C, 67.93%, 67.86%; H, 5.45%, 5.45%; CH, 18.6%.

For purposes of comparison, it was found that under similar reaction conditions other Friedel-Crafts type of catalysts such as $FeCl_3$, $SnCl_4$ and $TiCl_4$ were inoperative in the novel process of this invention.

It will be recognized by those skilled in the art that various modifications of the invention, some of which have been referred to above, can be made without departing from the spirit of the invention.

What is desired to be secured by Letters Patent is:

1. The process for preparing beta-disubstituted alpha-indanones which comprises simultaneously reacting carbon monoxide and an aryl-substituted aliphatic halide in the presence of an aluminum halide selected from the group consisting of aluminum chloride and aluminum bromide, wherein said aryl-substituted aliphatic halide is selected from the group consisting of
   1-halogeno-2-methyl-2-phenylpropane,
   1-phenyl-2-halogeno-2-methylpropane,
   1-halogeno-2-phenylpropane,
   1-phenyl-2,2-dihalogenopropane,
   1-phenyl-2-halogenopropane,
   1-phenyl-2-halogenopropene-1,
   1-phenyl-2-halogenopropene-2,
   1-halogeno-2-(beta-halogeno-tertiary butyl)benzene,
   1-halogeno-4-(beta-halogeno-tertiary buytl)benzene,
   1,4-dimethyl-bis-2,5-(beta-halogeno-tertiary butyl) benzene,
   1,4-dimethyl-2-(beta-halogeno-tertiary butyl)benzene,
   and mixtures thereof, wherein said halogeno substituent is selected from the group consisting of bromine, chlorine, fluorine, iodine and mixtures thereof, and recovering the beta-disubstituted alpha-indanone produced thereby.

2. The process for preparing 2,2-dimethylindanone-1 which comprises simultaneously reacting 1-chloro-2-methyl-2-phenylpropane with carbon monoxide in the presence of aluminum chloride.

3. The process for preparing 2,2-dimethylindanone-1 which comprises simultaneously reacting 1-phenyl-2-chloro-2-methylpropane with carbon monoxide in the presence of aluminum chloride.

4. The processing for preparing 2-methyl-2-phenyl-indanone-1 which comprises simultaneously reacting 1-phenyl-2-halogenopropene-2 with carbon monoxide in the presence of aluminum chloride.

5. The process for preparing 2-methyl-2-phenyl-indanone-1 which comprises simultaneously reacting 1-phenyl-2-halogenopropene-1 with carbon monoxide in the presence of aluminum chloride.

6. The process for preparing 2-methyl-2-phenyl-indanone-1 which comprises simultaneously reacting 1-phenyl-2-chloropropane with carbon monoxide in the presence of aluminum chloride.

7. The process for preparing 2,2-dimethyl indanone-1 which comprises simultaneously reacting 1,4-dimethyl-bis-2,5-(beta-chlorotertiary butyl)benzene with carbon monoxide in the presence of aluminum chloride and benzene.

8. The process for preparing 2-methyl-2-(chlorophenyl)indanone-1 which comprises simultaneously reacting a mixture of 1-phenyl-2,2-dichloropropane, 1-phenyl-2-chloropropene-2 and 1-phenyl-2-chloropropene-1 with chlorobenzene and carbon monoxide in the presence of aluminum chloride.

References Cited

UNITED STATES PATENTS 1,754,031  4/1930  Mayer et al. _____ 260—590

OTHER REFERENCES

Olah Friedel-Crafts and Related Reactions, volume III, Part 2, pages 1298 and 1299, Interscience Publishers, New York, N.Y.

DANIEL D. HORWITZ, Primary Examiner

U.S. Cl. X.R.

252—522; 260—651